(12) United States Patent
Shutou et al.

(10) Patent No.: US 9,041,882 B2
(45) Date of Patent: May 26, 2015

(54) OPTICAL LAMINATE AND LIQUID CRYSTAL DISPLAY DEVICE

(75) Inventors: Shunsuke Shutou, Ibaraki (JP); Minoru Miyatake, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 60 days.

(21) Appl. No.: 13/989,583

(22) PCT Filed: Nov. 15, 2011

(86) PCT No.: PCT/JP2011/076251
§ 371 (c)(1),
(2), (4) Date: May 24, 2013

(87) PCT Pub. No.: WO2012/070424
PCT Pub. Date: May 31, 2012

(65) Prior Publication Data
US 2013/0242236 A1   Sep. 19, 2013

(30) Foreign Application Priority Data
Nov. 25, 2010   (JP) ................... 2010-261936

(51) Int. Cl.
*G02F 1/1335*   (2006.01)
*G02B 5/30*     (2006.01)
*G02F 1/13363*  (2006.01)

(52) U.S. Cl.
CPC ........ *G02F 1/133528* (2013.01); *G02B 5/3033* (2013.01); *G02F 1/133526* (2013.01); *G02F 2001/133538* (2013.01); *G02F 2001/133631* (2013.01)

(58) Field of Classification Search
CPC .... G02B 5/305; G02B 5/3033; G02B 5/3025; G02B 27/2214; G02B 27/26; G02B 5/3016; C08J 5/18; G02F 1/133528; G02F 1/133536; G02F 5/3033; G02F 1/13363; H04N 13/0404
USPC ................... 349/96, 15; 359/487.01, 489.01, 359/489.07, 487.02
See application file for complete search history.

(56) References Cited

U.S. PATENT DOCUMENTS 5,956,001 A * 9/1999 Sumida et al. .................. 345/55
2006/0165918 A1* 7/2006 Ito ................................ 428/1.31
2011/0192529 A1* 8/2011 Yano et al. .................... 156/229

FOREIGN PATENT DOCUMENTS

| JP | 09-304740 A  | 11/1997 |
| JP | 2001-042310 A | 2/2001 |
| JP | 2001-350021 A | 12/2001 |
| JP | 2006-337892 A | 12/2006 |

OTHER PUBLICATIONS

International Search Report for PCT/JP2011/076251, Mailng Date of Feb. 21, 2012.

* cited by examiner

*Primary Examiner* — Mike Qi
(74) *Attorney, Agent, or Firm* — Westerman, Hattori, Daniels & Adrian, LLP

(57) ABSTRACT

There is provided an optical laminate which comprises: a polarizing film wherein a thin polarizing layer is laminated on one main surface of a substrate; and an optical element (lens array). The thin polarizing layer has a thickness of 8 μm or less. The substrate has a thickness of 20 μm to 80 μm. The optical element is a pattern retardation plate including a plurality of regions having different slow axis directions.

10 Claims, 6 Drawing Sheets

OPTICAL LAMINATE AND LIQUID CRYSTAL DISPLAY DEVICE

BACKGROUND OF THE INVENTION

The present invention relates to an optical laminate having a thin polarizing layer and a liquid crystal display device including the optical laminate.

DESCRIPTION OF RELATED ART

Liquid crystal display devices have been widely used for liquid crystal television sets, computer monitors, cell-phones, car navigation systems, and portable gazette games or the like because of characteristics such as being thin, light-weight, and low power consumption.

Liquid crystal display devices, however, have a problem that viewing angle dependency in visual quality is great. Viewing angle dependency typically means that while an image shows normal colors and a high contrast when a liquid crystal display device is observed in a front direction, an image shows different colors, reversed gradation, and a reduced contrast when the liquid crystal display device is observed in an oblique direction. An angular range where normal image can be observed is referred to as a viewing angle and great viewing angle dependency is referred to as the viewing angle is small.

Viewing angle dependency is generated by a variety of causes, such as an orientation mode of liquid crystal molecules, refractive index anisotropy, characteristics of a polarizing film, and directivity of a light source or the like. A liquid crystal display device, in which a lens array is locked on a polarizing plate, arranged on an observer's side of a liquid crystal display panel so as to reduce the viewing angle dependency thereof, is well known. A lens array is also referred to as a lens sheet, in which a plurality of tiny lenses are periodically arranged.

Although it is possible to improve viewing angle dependency by arranging a lens array in a liquid crystal display panel, there is a possibility that moire fringes may be caused by the interference of a periodic structure formed by pixels of the liquid crystal panel and a periodic structure of the lens array, which could result in deterioration in visual quality.

To prevent the generation of such moire fringes, it is needed to control pixel pitch of the liquid crystal panel and lens pitch of the lens array at a high degree of accuracy and provide an suitable angle in a lens array direction of the lens array (for example, JP 2001-42310 A).

Further, a stereoscopic display device which is capable of enhancing atmosphere of the scene has been developed. There are several techniques for stereoscopic display. JP 09-304740 A discloses a stereoscopic display device in which a plurality of pixel groups for right eye and a plurality of pixel groups for left eye two-dimensionally aligned are alternatively arranged in a column direction of a liquid crystal panel, a pattern retardation plate to correspond to each pixel group is formed on a polarizing film located on a front surface of the liquid crystal panel, and a plurality of lenticular lenses are disposed on the front surface of the liquid crystal panel.

To obtain appropriate stereoscopic display, it is necessary to control periodic structures of pixel groups and a retardation plate and periodic structures of lenticular lenses with a high degree of accuracy to be disposed by using lenticular lenses suitable for periodic structures of the pixel groups and the retardation plate.

Some stereoscopic display devices have no pattern retardation plates. However, even in a stereoscopic display device without pattern retardation plate, the structure except for the pattern retardation plate is the same as that of the aforementioned stereoscopic display device with a pattern retardation plate. Therefore, the stereoscopic display device without pattern retardation plate has the same problem as the stereoscopic display device with a pattern retardation plate has.

SUMMARY OF THE INVENTION

In a liquid crystal display panel, it is needed to control a pixel pitch of a liquid crystal panel and a lens pitch of a lens array at a high degree of accuracy and respectively provide an appropriate angle in a pixel array direction of the liquid crystal panel and in a lens array direction of a lens array so as to prevent moire fringes, color irregularity, and stereoscopic display blurring.

A polarizing film is interposed between a substrate and a lens array in a liquid crystal panel and the lens array is bonded to the polarizing film. When the dimension of the polarizing film is changed according to heat generated at the time when a backlight is lit, a temperature and a humidity in the external environment, there are fears that the lens array may be distorted by the influence of the polarizing film.

In the case where the lens array is distorted, the lens pitch and the lens array direction will vary and moire fringes and color irregularity will be generated, which may lead to a reduction in visual quality. Further, there are fears that the distortion of the lens array may cause the lens array to be peeled off from the polarizing film.

In a stereoscopic display device, when the dimension of the polarizing film is changed by heat generated at the time of lighting the backlight, the temperature and humidity in the external environment, there is a misalignment among the pattern retardation plate bonded to the polarizing film, the pixel groups, and the lens array. This may cause stereoscopic display blurring.

In the case where the lens array is adhered to the pattern retardation plate, there are fears that color irregularity may occur due to the distortion of the lens array and the lens array may be peeled off from the pattern retardation plate.

In a conventional polarizing film used for a liquid crystal display panel and a stereoscopic display device, a transparent protective film is bonded to both surfaces of a film with a thickness of around 30 μm which is referred to as a polarizer. The conventional polarizing film typically indicates a dimension change (shrinkage) of around −0.5% under an environment of 80° C. for 120 hours. In the case where such a −0.5% dimension change occurs, there are fears that moire fringes, color irregularity, and stereoscopic display blurring may be generated upon receiving influence of a lens array and a pattern retardation plate. That is, it would be difficult to prevent the moire fringes and color irregularity and stereoscopic display blurring from being generated because of low dimensional stability of the conventional polarizing film.

In the present invention, a polarizing film with less dimension change has been produced. This polarizing film and the lens array have been laminated to produce an optical laminate. And a liquid crystal display device with the optical laminate has been produced.

The polarizing film typically has a dimension change rate of 1−0.2% or lower under an environment of 80° C. for 120 hours (−0.2% or lower means −0.2% to 0%) in the present invention. In the liquid crystal display panel and the stereoscopic display device using the polarizing film of the present invention, there is less distortion in the lens array and there are less fears that moire fringes, color irregularity, and stereoscopic display blurring may be generated because the dimension change of the polarizing film is small.

The summary of the present invention is described as below.

In a first preferred embodiment, an optical laminate according to the present invention comprises: an optical element; and a polarizing film in which a thin polarizing layer is laminated on one main surface of a substrate. The optical element and the polarizing film are laminated and the thin polarizing layer has a thickness of 8 μm or less.

In a second preferred embodiment of the optical laminate according to the present invention, the substrate has a thickness of 20 μm to 80 μm.

In a third preferred embodiment of the optical laminate according to the present invention, the optical element is a lens array having a plurality of lenses to control a traveling direction of light.

In a fourth preferred embodiment of the optical laminate according to the present invention, the optical element is a retardation plate including a plurality of regions having different slow axis directions.

In a fifth preferred embodiment, a liquid crystal display device according to the present invention comprises: a liquid crystal panel; and the aforementioned optical laminate.

ADVANTAGES OF THE INVENTION

An optical laminate of the present invention obtained by laminating a polarizing film and an optical element is capable of appropriately controlling a traveling direction of light emitted from a lens array over a long period of time because of a very small dimension change caused by temperature changes, resulting in minimizing distortion of the lens array.

Further, a liquid crystal display device with the optical laminate of the present invention is capable of performing high-definition display with less moire fringes and color irregularity, and stereoscopic display blurring because the traveling direction of light emitted from the optimal laminate is appropriately controlled, even when placed in a high temperature state for a long period of time.

Furthermore, the optical laminate having a pattern retardation plate for stereoscopic display is capable of performing high-definition display without stereoscopic display blurring because of a very small dimension change caused by the temperature changes, which results in a curb in misalignment of pixel groups and the lens array.

DESCRIPTION OF THE PREFERRED EMBODIMENTS

[Optical Laminate]

Figure 1:
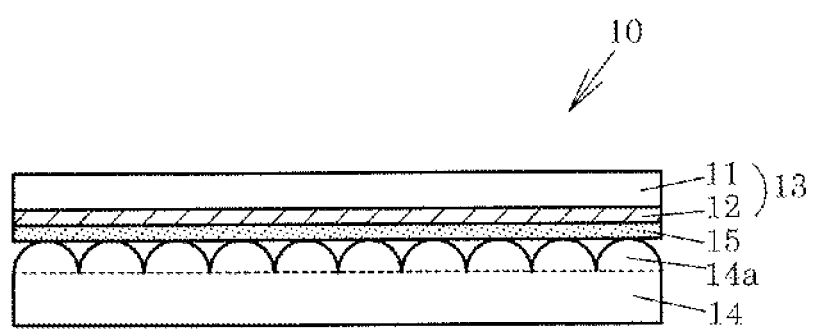
FIG. 1 is a schematic view of an optical laminate of the present invention.

FIG. 1 schematically shows one example of a cross-section of an optical laminate 10 of the present invention. A polarizing film 13, in which a thin polarizing layer 12 is laminated on one main surface of a substrate 11, and a lens array 14 are laminated to be integrated through an adhesive layer 15. The thin polarizing layer 12 has a thickness of 8 μm or less. The thin polarizing layer 12 develops an absorption axis and a transmission axis by being stretched together with the substrate and therefore, functions as a polarizing element. The lens array 14 is typically in a sheet state and is referred to as a lens sheet.

At this time, the main surface of lenses 14a-side of the lens array 14 is so arranged to oppositely face to the thin polarizing layer 12 and the adjacent lenses 14a are bonded to each other with no adhesive layer 15 embedded therebetween. This is because refractive effects of each lens 14a become weaker when the adhesive layer 15 is located between each lens 14a, so that viewing angle compensating effects caused by the lens array become smaller.

Figure 2:
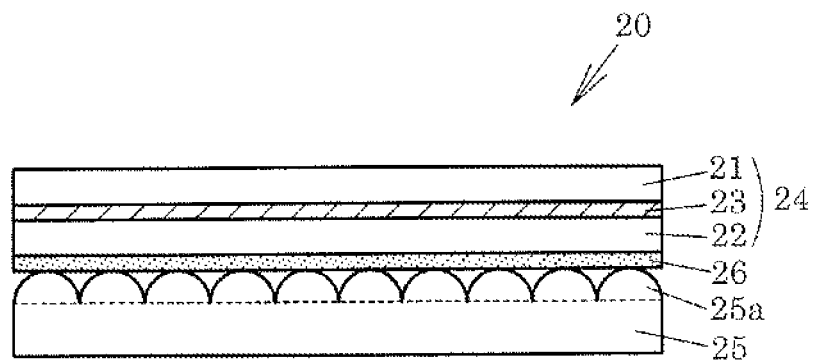
FIG. 2 is a schematic view of an optical laminate of the present invention.

FIG. 2 schematically indicates another example of a cross-section of an optical laminate 20 of the present invention. A polarizing film 24 obtained by interposing a thin polarizing layer 23 between two substrates 21, 22 and a lens array 25 are laminated to be integrated via an adhesive layer 26. The thin polarizing layer 23 has a thickness of 8 μm or less. At this time, a main surface of lenses 25a side of the lens array 25 is arranged so as to oppositely face to the polarizing film 24 and the adjacent lenses 25a are bonded to each other with no adhesive layer 26 embedded therebetween.

In the polarizing film 24, one of the two substrates 21, 22 and the thin polarizing layer 23 may be stretched and may be bonded to the other substrate after stretched. Further, the thin polarizing layer 23 may be interposed (bonded) between the two substrates 21, 22 and may be then stretched. As mentioned above, it is possible to prevent the thin polarizing layer 23 from being damaged by bonding the substrates 21, 22 to the front and back of the thin polarizing layer 23, for example, when dealing only the polarizing film 24.

[Polarizing Film]

A polarizing film to be used for a liquid crystal display device of the present invention typically has minor dimension changes, even when the polarizing film is placed at a high temperature (for example 80° C.) for a long period of time (for example, 120 hours). The polarizing film typically has a dimension change rate of −0.2% or lower (−0.2% to 0%).

FIGS. 3(a) to 3(f) illustrate respective examples of a polarizing film to be used for an optical laminate and a liquid crystal display device of the present invention and a conventional polarizing film as well.

Figure 3A:
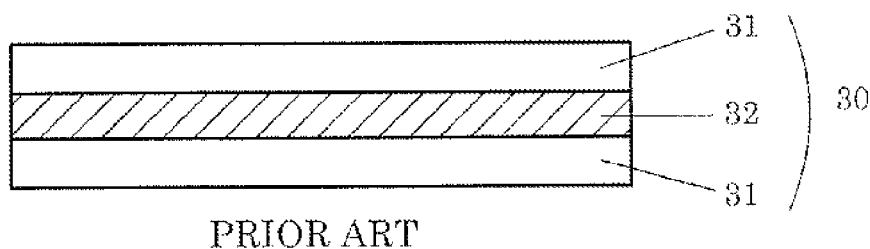
FIG. 3(a) is a schematic view of a conventional polarizing film.

FIG. 3(a) is a conventional polarizing film 30, in which a protective film 31 is bonded to the face and back of a polarizer 32. The protective film 31 is typically a triacetyl cellulose (TAC) film with a thickness of 40 µm. The polarizer 32 is typically a polyvinyl alcohol (PVA) film with a thickness of 30 µm.

Figure 3B:
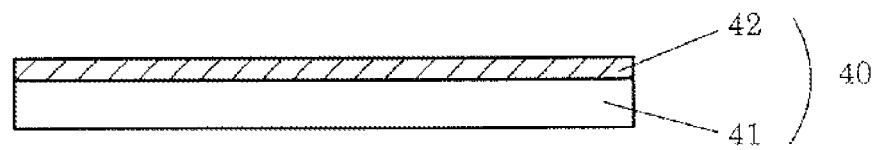
FIG. 3(b) is a schematic view of a polarizing film to be used in the present invention.

FIG. 3(b) is one example of a polarizing film 40 to be used in the present invention. A thin polarizing layer 42 is laminated on a surface of a substrate 41. The substrate 41 is typically a triacetyl cellulose (TAC) film with a thickness of 20 µm to 80 µm, an amorphous polyethylene terephthalate film, a polymethylpentene (TPX) film, an acrylic-based resin film, a norbornene-based resin film or the like. The thin polarizing layer 42 is typically a polyvinyl alcohol (PVA) layer with a thickness of 8 µm or less.

In the polarizing film 40 to be used in the present invention shown in FIG. 3(b), a polyvinyl alcohol aqueous solution is applied to a surface of the substrate 41 and is then dried to form a polyvinyl alcohol layer. Subsequently, the polyvinyl alcohol layer is stretched together with the substrate 41 and is dyed with iodine or the like to form the thin polarizing layer 42. Since the polarizing film 40 to be used in the present invention is produced by this production method, the thin polarizing layer 42 has a very small thickness compared with the conventional polarizing film 30 (The thickness of the conventional polarizer 32 is about 30 µm and the thickness of the thin polarizing layer 42 is 8 µm or less).

Figure 3C:
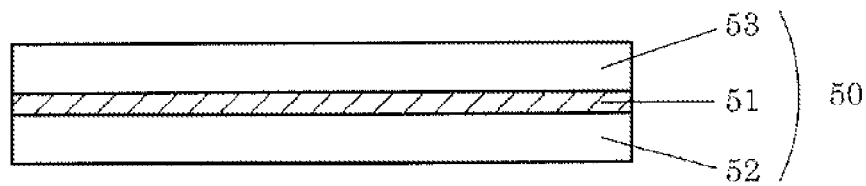
FIG. 3(c) is a schematic view of a polarizing film to be used in the present invention.
Figure 3D:
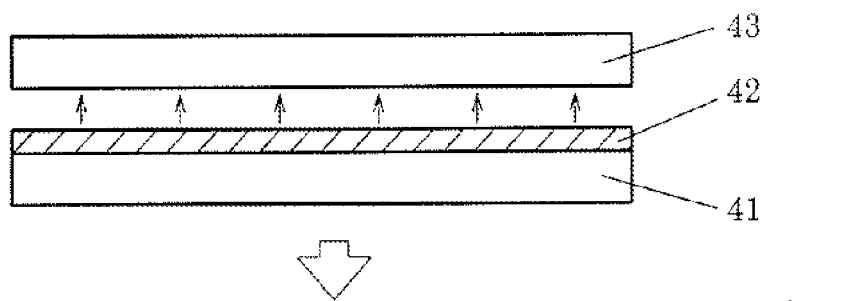
FIG. 3(d) is a schematic view of a polarizing film to be used in the present invention.
Figure 3E:
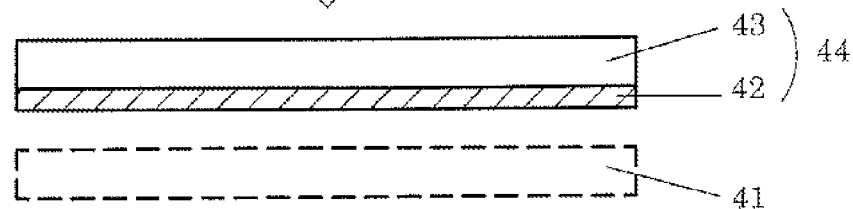
FIG. 3(e) is a schematic view of a polarizing film to be used in the present invention.
Figure 3F:
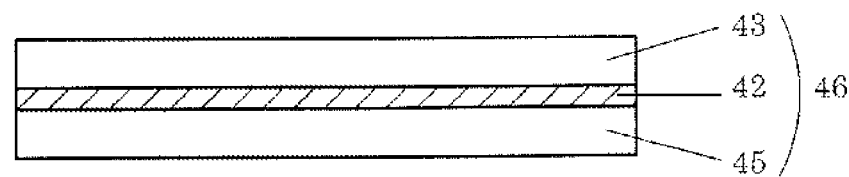
FIG. 3(f) is a schematic view of a polarizing film to be used in the present invention.

FIG. 3(c) is another example of a polarizing film 50 to be used in the present invention, in which both surfaces of the thin polarizing layer 51 are held by the substrates 52, 53. The substrates 52, 53 are typically a triacetyl cellulose (TAC) film with a thickness of 20 µm to 80 µm, an amorphous polyethylene terephthalate film, a polymethylpentene (TPX) film, an acrylic-based resin film, and a norbornene-based resin film or the like. The thin polarizing layer 51 is typically a polyvinyl alcohol (PVA) layer with a thickness of about 8 µm or less.

In the polarizing film 50 to be used in the present invention shown in FIG. 3(c), a polyvinyl alcohol aqueous solution is applied to a surface of one substrate 52 and is then dried to form a polyvinyl alcohol layer. Subsequently, the polyvinyl alcohol layer is stretched together with one substrate 52 and is dyed with iodine to form the thin polarizing layer 51 and the other substrate 53 is bonded to the thin polarizing layer 51. Since the polarizing film 50 to be used in the present invention is produced by this production method, the thin polarizing layer 51 has a very small thickness, compared with the conventional polarizing film 30 (The thickness of the conventional polarizer 32 is about 30 µm and the thickness of the thin polarizing layer 51 of the present invention is 8 µm or less).

The reasons why the polarizing films 40, 50 to be used in the present invention have minor dimension changes are presumed as follows:

1) The thin polarizing layers 42, 51 respectively have a small thickness. While the conventional polarizer 32 has a thickness of about 30 µm, the thin polarizing layers 42, 51 to be used in the present invention respectively have a thickness of 8 µm or less. Thin layers and films generally have minor dimension changes than thick layers and films.

2) Regarding the substrates 41, 52, 53, materials having less dimension changes caused by high temperatures than the thin polarizing layers 42, 51 are selected. In the polarizing films 40, 50 to be used in the present invention, when shrinkage stress is produced in the thin polarizing layers 42, 51, the thickness of the substrates 41, 52, 53 is greater than the thickness of the thin polarizing layers 42, 51, resulting in greater rigidity than that of the thin polarizing layers 42, 51. As a result, the substrates 41, 52, 53 are less influenced by stress produced in the thin polarizing layers 42, 51 and the polarizing films 40, 50 do not easily shrink.

In the polarizing films 40, 50 to be used in the present invention, the thin polarizing layers 42, 51 preferably have a thickness of 8 µm or less and the substrates 41, 52, 53 preferably have a thickness of 20 µm to 80 µm. In the case where the substrates 41, 52, 53 respectively have a thickness of less than 20 µm, rigidity of the substrates 41, 52, 53 become short, which may result in easy shrinkage of the polarizing films 40, 50. In the case where the substrates 41, 52, 53 respectively have a thickness of over 80 µm, the polarizing films 40, 50 become too thick and lack flexibility, which results in shortage of practicability, such as easy bonding to a panel.

On the other hand, also in the conventional polarizing film 30, a material having much less dimension changes caused by high temperatures than the polarizer 32 is selected as the protective film 31. Typically, the protective film 31 has a dimension change rate of about −0.03%.

However, the polarizer 32 is as thick as the protective film 31, so that the protective film 31 does not have enough rigidity to counter shrinkage stress when shrinkage stress in the polarizer 32 is generated. It is, therefore, difficult to prevent the shrinkage of the polarizing film. According to an experiment of the inventors of the present invention, as the thickness of the protective film 31 becomes smaller, the polarizing film 30 tends to have a greater dimension shrinkage rate.

[Production Method of Polarizing Film]

The polarizing film 40 is obtained by laminating the substrate 41 and the thin polarizing layer 42. And the polarizing film 50 is obtained by laminating the substrates 52, 53 and the thin polarizing layer 51. It is possible to obtain production methods of these polarizing films by processes mentioned below.

The polarizing film 40 of the present invention is produced by the steps of: applying a vinyl alcohol-based polymer thin layer to a surface of the substrate 41; stretching the thin layer together with the substrate 41; dyeing, for example, iodine or the like to add a polarizing function to the thin layer; and forming a laminate which comprises the substrate 41 and the thin polarizing layer 42.

The polarizing film 50 of the present invention is produced by the steps of: applying a vinyl alcohol-based polymer thin layer to a surface of the substrate 52; stretching the thin layer together with the substrate 52; dyeing, for example, iodine or the like to add a polarizing function to the thin layer; forming a laminate which comprises the substrate 52 and the thin polarizing layer 51; and further laminating the substrate 53 on the thin polarizing layer 51.

Thus obtained polarizing films 40, 50 are not susceptible to temperatures and humidity and have very little dimension changes caused by the temperatures and humidity. Since dimension changes of a polarizing film are generally controlled by a polarizer which most easily expands and shrinks, the polarizing films 40, 50 of the present invention including the thin polarizing layers 42, 51 with minor dimension changes have a small dimension change rate.

More specifically, it is possible to limit the dimension change rate of the polarizing films 40, 50 at least −0.2% or lower (−0.2% to 0%), preferably −0.1% or lower (−0.1% to 0%) when stored in a constant temperature environmental test laboratory at 80° C. for 120 hours.

Although the reason why the dimension change rate of the polarizing films 40, 50 is small has not completely been figured out, it is presumed that items including the following (a) to (d) other than the aforementioned (1) and (2) multiply operate:
(a) To be a vinyl alcohol-based polymer thin layer
(b) A vinyl alcohol-based polymer thin layer is formed and the thin layer is closely laminated on the substrates 41, 52 without through an adhesive layer or the like.
(c) Not only the vinyl alcohol-based polymer thin layer is stretched but also the substrates 41, 52 are stretched together with the thin layer.
(d) After the vinyl alcohol-based polymer thin layer and the substrates 41, 52 are stretched together, iodine or the like are dyed.

The polarizing film 40 comprises: the substrate 41; and the thin polarizing layer 42. The thickness of the polarizing film 40 varies according to the thickness of the substrate 41 to be used. The polarizing film 40, however, preferably has a thickness of about 20 μm to 90 μm.

The polarizing film 50 comprises: the substrates 52, 53; and the thin polarizing layer 51. The thickness of the polarizing film varies according to the thickness of the substrates 52, 53. The polarizing film 50, however, preferably has a thickness of about 40 μm in to 170 μm.

The thin polarizing layers 42, 51 preferably have a polarization degree of 99% or higher and preferably have a transmittance of 39% to 46%.

It is possible to uniformly apply the vinyl alcohol-based thin polarizing layer on the substrates 41, 52 to be used in the aforementioned process. The substrates 41, 52 are superior in smoothness. In addition, stretching is possible in a state in which the aforementioned thin layer is closely laminated on the substrates 41, 52. The thin layer having a superior stretching property is preferably used.

Typical examples of materials for the substrates 41, 52 include olefin-based polymers, norbornene-based polymers, acrylic-based polymers, amorphous polyethylene terephthalate polymers, and blended polymers thereof or the like. To increase adhesion of the vinyl alcohol-based polymer thin layer, an easily adhesive layer, such as an urethane resin or the like may be formed on the substrates 41, 52.

The thickness of the substrates 41, 52 before stretching is preferably 50 μm to 200 μm and the thickness of the substrates 41, 52 after stretching is preferably 20 μm to 80 μm. When the substrates 41, 52 respectively have an easily adhesive layer, the range of each thickness of the substrates 41, 52 is a thickness including the easily adhesive layer.

Vinyl alcohol-based polymers are typically polyvinyl alcohol or ethylene vinyl alcohol copolymers. Polyvinyl alcohol is obtained by saponification and hydrolysis of polyvinyl acetate and ethylene vinyl alcohol copolymers are obtained by the saponification and hydrolysis of ethylene-vinyl acetate copolymers.

Vinyl alcohol-based polymers are dissolved in a suitable solvent (e.g., hot water) to be in a solution state and are then formed on respective surfaces of the substrates 41, 52 in a thin layer state with any coater. The thickness of the vinyl alcohol-based polymer thin layer before stretching is preferably 1 μm to 20 μm.

A laminate of the vinyl alcohol-based polymer thin layer and the substrates 41, 52 is stretched (stretching in the air) in vertical and horizontal directions or an oblique direction by any stretcher (e.g., Tenter stretcher). As mentioned above, it is possible to uniformly stretch the thin layer without fracturing of the thin layer by stretching the thin layer together with the substrates 41, 52. Although a stretch ratio at this time is set at any ratio in accordance with optical characteristics of the thin polarizing layers 42, 51 to be finally obtained, the stretch ratio is preferably 3 times to 6 times. The stretching temperature at this time is preferably 100° C. to 180° C.

The aforementioned stretching is normal stretching in the air. However, as a result of the applicant's research, it has been found out that it is possible to obtain a thin polarizing layer with further superior optical characteristics by stretching (stretching in a boric acid aqueous solution) a polyvinyl alcohol-based resin in a boric acid solution at a low temperature (85° C. or lower) so that the total stretch ratio may be more than 5 times.

Boric acid generates tetrahydroxy borate anion in an aqueous solution. The tetrahydroxy borate anion is presumed to be hydrogen bonded to a hydroxyl group of the vinyl alcohol-based polymers to cross-link the vinyl alcohol-based polymers. This cross-linking makes the vinyl alcohol-based polymers insolvent, so that the vinyl alcohol-based polymers may be stretched in the aqueous solution.

It becomes possible to stretch the polyvinyl alcohol-based resin at a high magnification of 5-fold or higher in the total stretch ratio because the polyvinyl alcohol-based resin layer becomes insoluble by stretching the polyvinyl alcohol-based resin in a boric acid aqueous solution.

It is difficult to obtain a high quality thin polarizing layer by a conventional manufacturing method for stretching a thin polyvinyl alcohol-based resin integrated with a resin substrate. This is caused by using a stretching method which is referred to as "stretching in the air." Regardless of the temperature, in the case of stretching in the air, it is difficult to set the total stretch ratio including the resin substrate to be stretched at least 5 times as long as the original length by the promotion of crystallization of the polyvinyl alcohol-based resin by stretching. It is deduced that it becomes impossible to fully adsorb and highly orient a dichroic material by the formation of a higher-order structure (large structure), such as a lamella structure and a sphere crystal, which does not contribute to the orientation, on the polyvinyl alcohol-based resin.

It is possible to stretch the thin polyvinyl alcohol-based resin at a high magnification of more than 5-fold while preventing the polyvinyl alcohol-based polymers from being crystallized by stretching the polyvinyl alcohol-based resin at a low temperature in boric acid aqueous solution. As a result, it has reached a deduction that the orientation of a non-crystalline portion in the thin polyvinyl alcohol-based layer will be increased. Further, stretching at a high magnification rate enables the dichroic material, such as a poly iodine ion complex which exists in the polyvinyl alcohol-based resin to be highly arranged in one direction. As a result, a thin polarizing layer with high optical characteristic is obtained.

The laminate of the stretched substrates 41, 52 and the thin layer are immersed in a dyebath containing a dichroic material (for instance, iodine and an organic dye) to be dyed. At this time, in the case where a hydrophobic resin (for instance, norbornene-based polymers) without hydroxyl group is used as a material for the substrates 41, 52, the substrates 41, 52 are not dyed. The dyebath preferably has a temperature of 10° C. to 50C. Time to immerse the stretched laminate in the dyebath is preferably 5 seconds to 240 seconds.

As shown in FIGS. 3(*d*) to 3(*e*), the thin polarizing layer 42 is transcribed to the other substrate 43 via an adhesive (not shown) to manufacture the polarizing film 44. The substrate 43 after having been transcribed may be typically used as a protective film. The substrate 43 is manufactured by casting or extrusion and the material and thickness thereof is appropriately selectable. In addition, as shown in FIG. 3(*f*), it is also possible to manufacture a polarizing film 46 in which both sides of the thin polarizing layer 42 are protected by laminating a protective film 45 on the thin polarizing layer 42.

A substrate conventionally used is a triacetyl cellulose (TAC) film with a thickness of 40 μm and 80 μm. In view of handling or the like, the triacetyl cellulose film with a thickness of around 20 μm may be used as a protective film. Accordingly, the substrate 43 to be used as a protective film after having been transcribed preferably has a thickness of 20 μm to 80 μm.

According to the presumption of the present inventors, the thin layer of the vinyl alcohol-based polymers is stretched and is then immersed in a dyebath to cause the thin layer to swell and have effects of minimizing the dimension change ratio of the thin polarizing layers 42, 51 by reducing internal stress.

[Lens Array]

Figure 4:
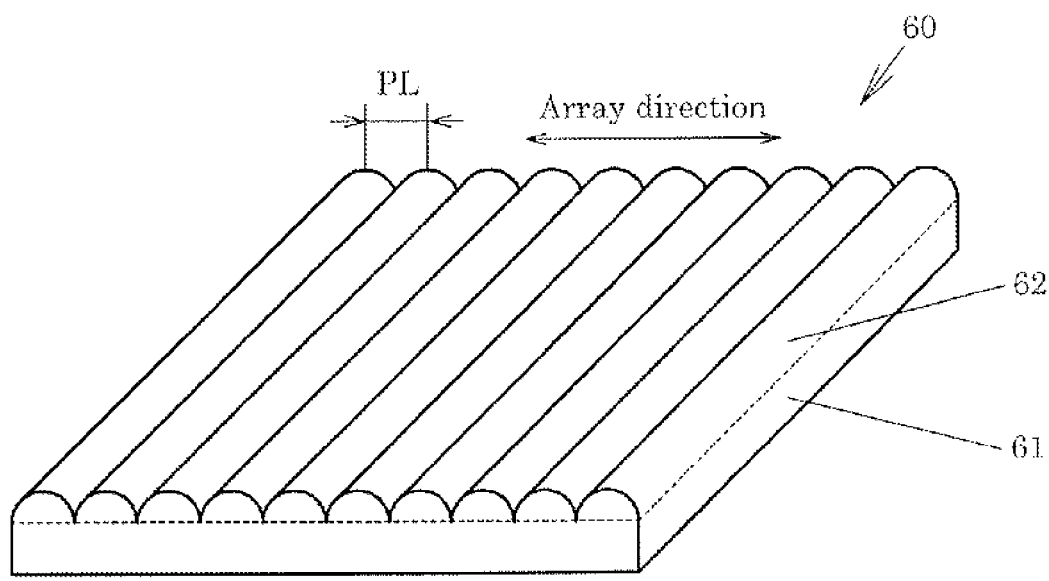
FIG. 4(a) is a schematic view of a lens array to be used in the present invention.
FIG. 4(b) is a schematic view of a flyeye lens to be used in the present invention.
Figure 4:
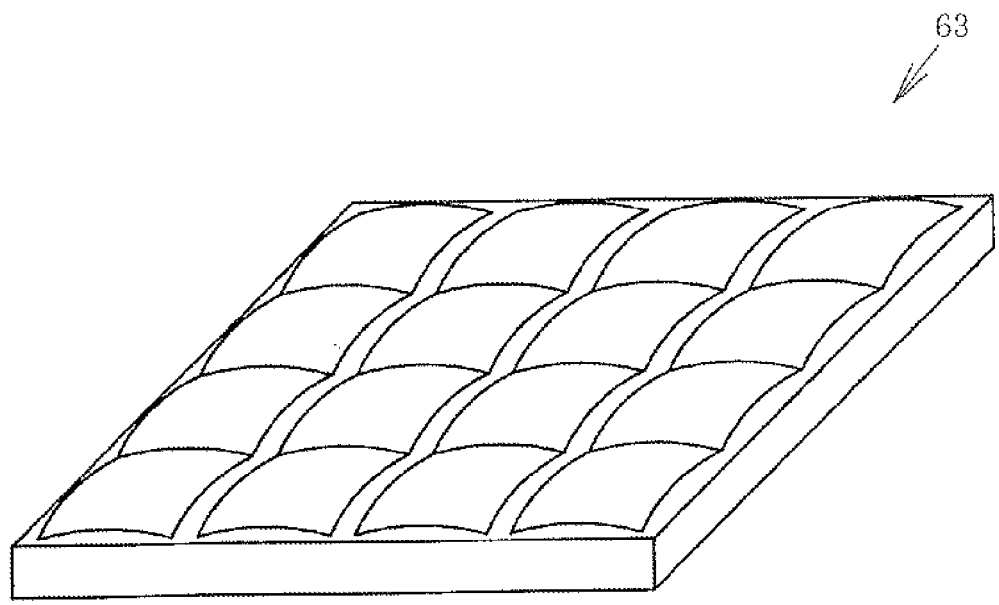

FIG. 4(a) shows one example of a lens array 60 to be used for a liquid crystal display device of the present invention. A plurality of lenticular lenses 62 are periodically aligned at a pitch $P_L$ on one surface of a transparent substrate 61. The pitch $P_L$ is typically around 0.1 mm. A direction which is perpendicular to an optical axis of each lenticular lens 62 is an array direction of each lenticular lens 62. Other lenses to align may include the flyeye lens 63 shown in FIG. 4(b), a linear frenel lens, a micro prism, a cylindrical lens, a micro lens array or the like.

In the optical laminate 10 which comprises the polarizing film 13 and the lens array 14 shown in FIG. 1, the polarizing film 13 has a much smaller shrinkage ratio than a conventional polarizing film has. As a result, it is possible to control distortion of the lens array 14. Therefore, incident light to enter a color filter (not shown) does not deviate, so that it is possible to control the generation of color irregularity.

[Liquid Crystal Display Device]

Figure 5A:
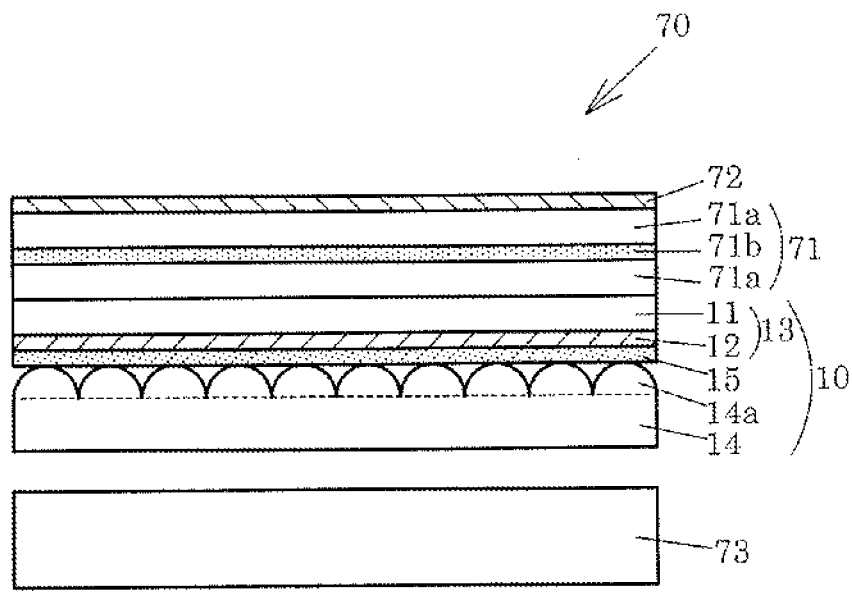
FIG. 5(a) is a schematic view of a liquid crystal display device of the present invention.

FIG. 5(a) schematically shows one example of a liquid crystal display device 70 of the present invention. The liquid crystal display device 70 comprises: a liquid crystal panel 71; the optical laminate 10 of the present invention; and a polarizing film 72; and a surface light source (backlight) 73.

The liquid crystal panel 71 includes a liquid crystal layer 71b interposed between a pair of substrates 71a. The optical laminate 10 of the present invention is adhered to a side of the surface light source 73 of the liquid crystal panel 71. The polarizing film 72 is adhered to a side opposite to the optical laminate 10 of the liquid crystal panel 71.

Figure 5B:
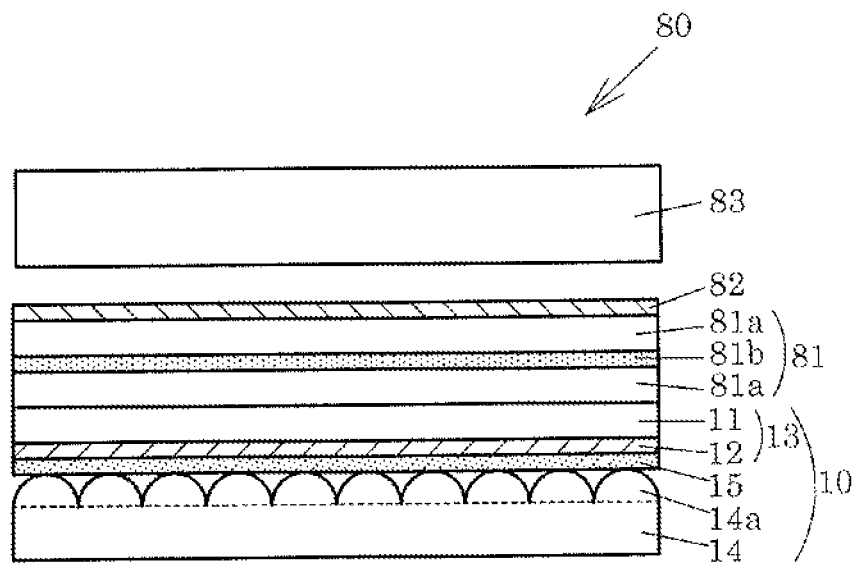
FIG. 5(b) is a schematic view of a liquid crystal display device of the present invention.

FIG. 5(b) schematically shows another example of a liquid crystal display device 80 of the present invention. The liquid crystal display device 80 comprises: a liquid crystal panel 81; the optical laminate 10 of the present invention; a polarizing film 82; and a surface light source (backlight) 83. The liquid crystal panel 81 includes a liquid crystal layer 81b interposed between a pair of substrates 81a. The liquid crystal display device 80 differs from the liquid crystal display device 70 shown in FIG. 5(a) in that the surface light source 83 is located at a side opposite to the optical laminate 10 with reference to the liquid crystal panel 81.

Figure 6A:
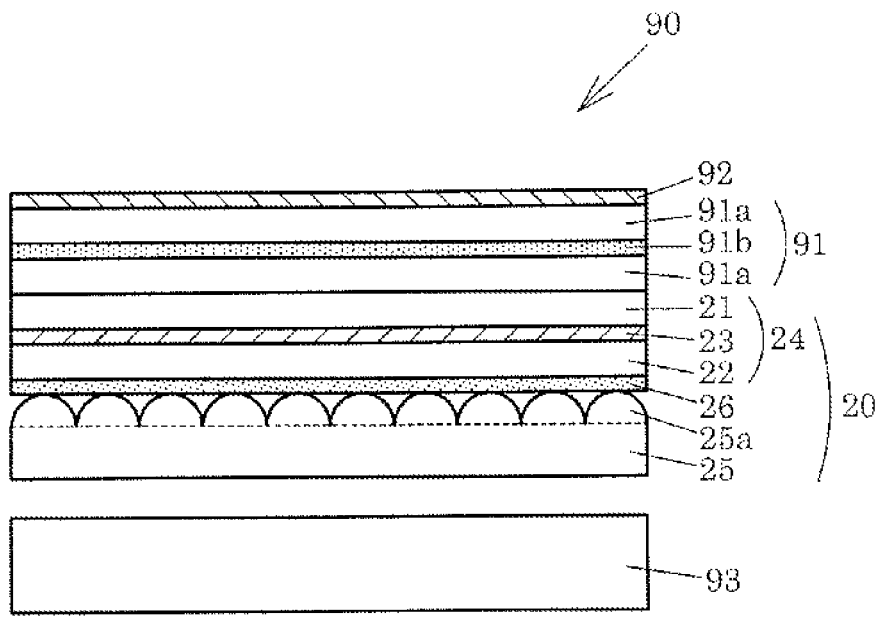
FIG. 6(a) is a schematic view of a liquid crystal display device of the present invention.

FIG. 6(a) schematically shows another example of a liquid crystal display device 90 of the present invention. The crystal display device 90 comprises: a liquid crystal panel 91; the optical laminate 20 of the present invention; a polarizing film 92; and a surface light source (backlight) 93.

The liquid crystal panel 91 includes a liquid crystal layer 91b interposed between a pair of substrates 91a. The optical laminate 20 is adhered to a side of the surface light source 93 of the liquid crystal panel 91. The polarized film 92 is adhered to a side opposite to the optical laminate 20 of the liquid crystal panel 91.

Figure 6B:
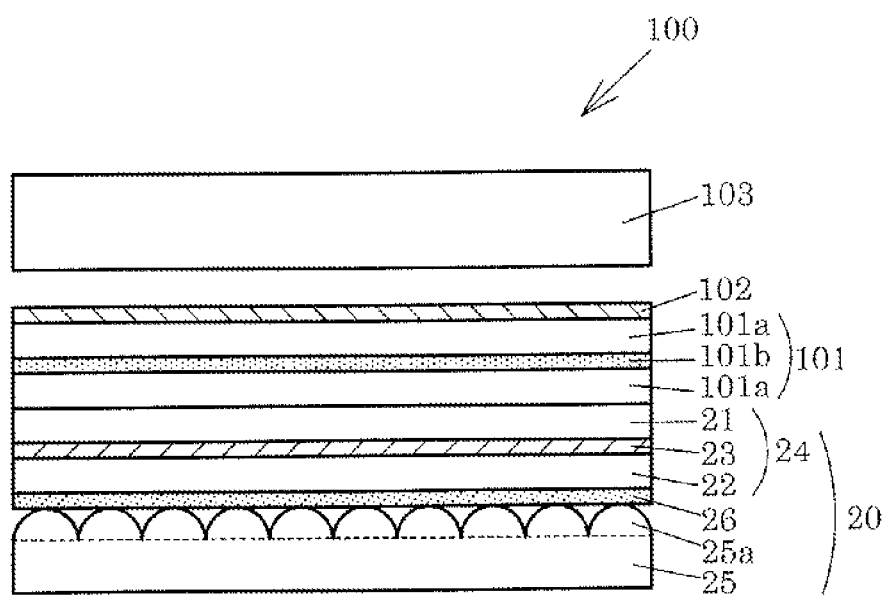
FIG. 6(b) is a schematic view of a liquid crystal display device of the present invention.

FIG. 6(b) schematically shows another example of a liquid crystal display device 100 of the present invention. The liquid crystal display device 100 comprises: a liquid crystal panel 101; the optical laminate 20 of the present invention; a polarizing film 102; and a surface light source (backlight) 103. The liquid crystal panel 101 includes a liquid crystal layer 101b interposed between a pair of substrates 101a. The difference between the liquid crystal display device 100 shown in FIG. 6(b) and the liquid crystal display device 90 shown in FIG. 6(a) is that the surface light source 103 is located at a side opposite to the optical laminate 20 with reference to the liquid crystal panel 101.

Figure 7:
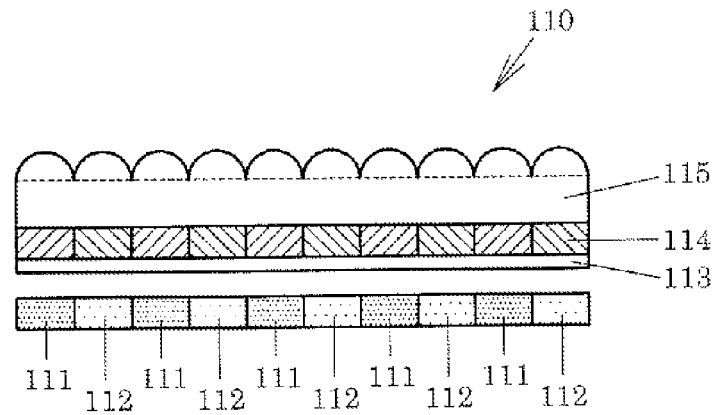
FIG. 7 is a schematic view of a conventional liquid crystal display device.

The present invention is also applicable to a stereoscopic display device with a liquid crystal panel. A typical applicable stereoscopic display device includes a lenticular-style liquid crystal display device 110 shown in FIG. 7 (JP 09-304740 A). Generally, to emit right circular polarization to correspond to pixel groups 111 for right eye of liquid crystal cells and left circular polarization to correspond to pixel groups 112 for left eye of liquid crystal cells, a pattern retardation plate 114 and a lens array 115 are sequentially laminated directly on a polarizing film 113. And the pattern retardation plate 114 has a plurality of slow axis patterns to correspond to cylindrical lenses (lens arrays 115).

In terms of a method for forming the pattern retardation plate 114, a variety of methods are disclosed. Typically, a half-wavelength plate is alternately patterned in a direction parallel to a scanning line by using a photolithography process to form a portion with a phase difference of the half-wavelength plate and a portion without phase difference of the half-wavelength plate on a substrate. A quarter-wavelength plate with a slow axis perpendicular to a slow axis whose portion has a phase difference of a half wavelength located on both the portion with a phase difference and the portion without phase difference is laminated on an overall surface of the substrate. As a result, there is a method for forming a pattern quarter-wavelength plate in the shape of a stripe perpendicular to the slow axis.

As another method, a rubbing oriented layer composed of polyimide or polyvinyl alcohol or the like is formed on a substrate. To obtain alternate slow axes in a direction parallel to a scanning line, a mask pattern is produced to control a rubbing direction in the state of a stripe. There is a method for forming a quarter-wavelength plate in the state of a stripe alternately perpendicular to the slow axes by orienting a liquid crystal material.

There is further another method that a photo-aligned layer is formed on a substrate and a mask pattern is then manufactured to alternately obtain slow axes in a direction parallel to a scanning line. At the time of polarized ultraviolet irradiation, a pattern of the polarized ultraviolet is controlled in the state of a stripe and a liquid crystal material is aligned thereon. As mentioned above, there is a method for forming a quarter-wavelength plate in the shape of a stripe alternately perpendicular to the slow axes.

Figure 8:
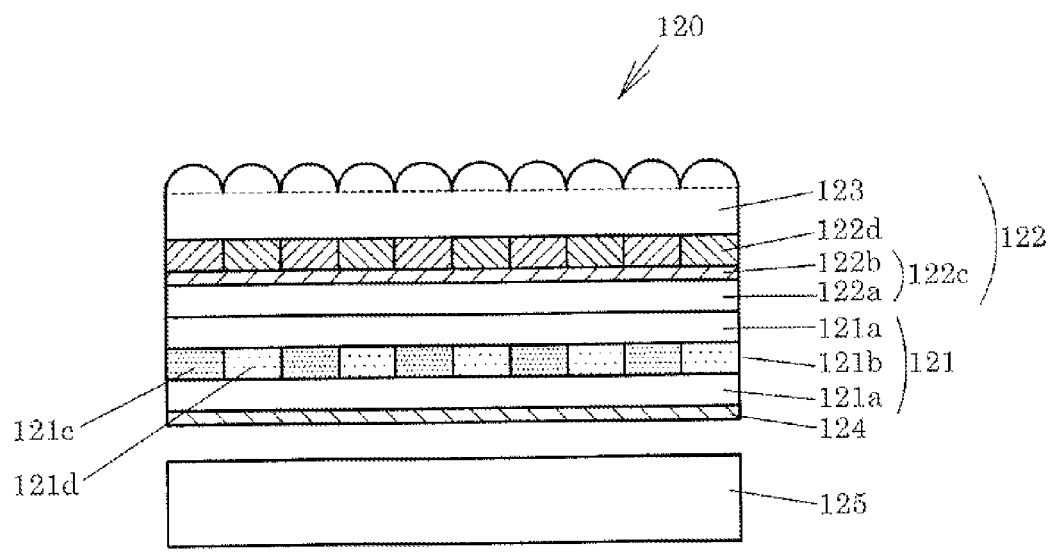
FIG. 8 is a schematic view of a liquid crystal display device of the present invention.

FIG. 8 shows a schematic view of one example of a liquid crystal display device 120 of the present invention. The liquid crystal display device 120 is capable of stereoscopic display. The liquid crystal display device 120 comprises: a liquid crystal panel 121; an optical laminate 122 of the present invention; a lens array 123; a polarizing film 124; and a surface light source (backlight) 125.

The liquid crystal panel 121 includes a liquid crystal layer 121b interposed between a pair of substrates 121a. Pixel groups 121c for right eye and pixel groups 121d for left eye are alternately placed in liquid crystal cells in the liquid crystal layer 121b.

The optical laminate 122 of the present invention is obtained by laminating a polarizing film 122c obtained by laminating a thin polarizing layer 122b on one main surface of a substrate 122a and a pattern retardation plate 122d.

Pitches of the pixel groups 121c for right eye and the pixel groups 121d for left eye, pitches of the pattern retardation plate 122d, and the pitch of the lens array 123 correspond to one another.

Although the lens array 123 is arranged on the pattern retardation plate 122d, the lens array 123 is not caused to be bonded to the pattern retardation plate 122d and may be fixed to the pattern retardation plate 122d by a bezel. Alternatively, the lens array 123 may be bonded to the pattern retardation plate 122d by an adhesive or the like.

In the case where a conventional polarizing film is fixed by a bezel, the dimension of the polarizing film is subject to change in accordance with heat generated when a surface light source is lit, changes of temperatures and humidity due to external environment. Accordingly, positions of the pattern retardation plate and liquid crystal cells are easily misaligned, resulting in easy generation of stereoscopic display blurring.

In the case where a conventional polarizing film is bonded to a lens array, dimension changes of the polarizing film are visually smaller, however, stereoscopic display blurring easily occurs due to distortion of the lens array caused by shrinkage stress of the polarizing film.

When the optical laminate 122 including the polarizing film 122c of the present invention is used, even though there are temperature and humidity changes because of heat generated at the time of lighting the surface light source 125 and external environment, no misalignment of the pattern retardation plate 122d and no distortion of the lens array 123 occur. This makes it possible to control stereoscopic display blurring.

In the case where a conventional polarizing film is used for such a liquid crystal display device, it is possible to prevent moire fringes from being generated at the beginning of manufacturing. However, distortion of an optical element is created when vehicle installation or the like is subject to dimension changes of the polarizing film under high-temperature environment. When the optical element is a lens array, the Pitch $P_L$ of a lens array or an array direction is misaligned, and the lens array and the polarizing film are peeled off. When the optical element is a pattern retardation plate, there is misalignment between the pattern retardation plate and the pixel groups. As a result, there is a possibility that moire fringes, color irregularity or stereoscopic display blurring may be created. However, when the optical laminates 10, 20, 122 of the present invention are used, no distortion or peeling of the optical element is created even under high-temperature environment and therefore, misalignment between the optical element and other optical members can be controlled. As a result, moire fringes, color irregularity or stereoscopic display blurring is controlled.

EXAMPLES

In Examples 1 to 14, a substrate was coated with polyvinyl alcohol to manufacture a liquid crystal display device having an optical laminate of the present invention manufactured by stretching and dyeing.

In a polarizing film, a polyvinyl alcohol coated layer had a thickness of four standards (3.2 μm, 4.3 μm, 10.0 μm, and 18.0 μm). Further a thin polarizing layer after stretching and dyeing had a thickness of four standards (1.3 μm, 1.7, 4.0 μm, and 7.2 μm).

Kinds and thicknesses of substrates were selected and manufactured as shown in Table 1.

Comparative Examples 1 to 8 respectively relate to a polarizing film obtained by a manufacturing method based on a conventional method for stretching a polarizer.

Example 1

A polyvinyl alcohol resin (produced by JAPAN VAM & POVAL CO., LTD.; product name: JC-40) was dissolved in hot water and was then cooled to prepare a 7% by weight of a polyvinyl alcohol aqueous solution.

A surface of a norbornene-based resin film (manufactured by JSR corporation; product name: Arton) was corona-treated for easy adhering. Subsequently, the surface of the norbornene-based resin film was coated with a polyvinyl alcohol aqueous solution to be dried at 100° C. for 10 minutes so as to obtain a polyvinyl alcohol coated layer with a thickness of 3.2 μm. This enabled to obtain a laminate in which the polyvinyl alcohol coated layer and the norbornene-based resin film were laminated.

Thus obtained laminate was stretched as 4.5 times as long as the original length by free end longitudinal stretching at 140° C. (stretch in a longitudinal direction without holding a width directional end of the laminate) using roll to roll to obtain a stretched laminate. In the laminate after stretching, the film had a width of 360 nm and a substrate had a thickness of 40 μm, and the polyvinyl alcohol coated layer had a thickness of 1.3 μm.

Subsequently, the stretched laminate was immersed in an iodine aqueous solution at 20° C. (iodine: potassium iodine: water=1:10:200) for 60 seconds and was then immersed in a boric acid aqueous solution of 10% by weight at 55° C. for 420 seconds. Further, the stretched laminate was immersed in an iodine potassium aqueous solution of 4% by weight at 30° C. for 10 seconds and was then dried at 60° C. for 4 minutes to obtain a polarizing film. A thin polarizing layer composed of a polyvinyl alcohol coated layer in the finished polarizing film had a thickness of 1.3 μm.

When optical characteristics of the obtained polarizing film were measured with a spectrophotometer with an integrating sphere (manufactured by HITACHI, LTD., product name: U-4100) in a configuration that light emitted from a prism thin polarizing layer was incident on the polyvinyl alcohol coated layer, the polarizing film had a transmittance of 41.5% and a polarizing degree of 99.8%.

Each transmittance relative to each linear polarization was measured assuming perfect polarization obtained through a Glan-Taylor prism thin polarizing layer was 100%. Each transmittance was indicated by Y value whose visibility has been corrected was calculated based on CIE1931 color system.

Moreover, polarization degree P was calculated as follows: $P=\{(k_1-k_2)/(k_1+k_2)\}\times100$. $k_1$ is a transmittance of a linearly polarized light in a maximum transmittance direction and $k_2$ is a transmittance of a linearly polarized light in an orthogonal direction.

In a lens array, a norbornene-based film (manufactured by JSR Corporation; product name: ARTON with a thickness of 150 μm and a width of 750 mm) was used as a transparent substrate. And an ultraviolet curable resin (manufactured by JSR Corporation; product name: Z9001) which was injected and cured in a mold having a predetermined recess was transcribed to a surface of the transparent substrate. Lens pitch PL was 0.1 nm, and the lens height was 0.04 mm.

As shown in FIG. 6(b), an optical laminate of the present invention which comprises a lens array and a polarizing film was bonded to a liquid crystal panel by an acrylic adhesive to manufacture a liquid crystal display device for observing moire fringes and color irregularity.

Furthermore, as shown in FIG. 8, an optical laminate of the present invention composed of a pattern retardation plate and a polarizing film was fixed between a lens array and a liquid crystal panel by an acrylic adhesive to manufacture a liquid crystal display device for observing stereoscopic display blurring. The liquid crystal panel comprises: a liquid crystal cell including pixel groups for right eye and pixel groups for left eye.

An environmental test for heating at 80° C. for 24 hours was performed with respect to the liquid crystal display device in Example 1. As a result of investigating display deterioration after the test, no color irregularity, moire fringes, stereoscopic display blurring was found and there was no deterioration in display.

An environmental test for heating at 80° C. for 120 hours was performed with respect to the polarizing film alone used in Example 1. As shown in Table 1, the polarizing film had a dimension change rate of −0.022% in MD (a machine direction) and −0.049% in TD (a transverse direction).

Examples 2 to 6

The coated amount of the polyvinyl alcohol aqueous solution was adjusted so that the thickness of the thin polarizing layer composed of a polyvinyl alcohol coated layer and the thickness of the substrate might be adjusted as shown in Table 1. A polarizing film and a liquid crystal display device were manufactured in the same manner as in Example 1 except for the above.

An environmental test was performed for a liquid crystal display device in the same manner as in Example 1. After the test, there were no color irregularity, moire fringes, and stereoscopic display blurring and there was no deterioration in display. The dimension change rate in the environment test for the polarizing film alone by heating at 80° C. for 120 hours was as shown in Table 1.

Examples 7 to 14

The coated amount of the polyvinyl alcohol aqueous solution was adjusted so that the thickness of the thin polarizing layer composed of a polyvinyl alcohol coated layer and the thickness of the substrate might be adjusted as shown in Table 1. As shown in FIG. 3(c), both surfaces of the thin polarizing layer were interposed between two substrates to be laminated, which led to obtain a polarizing film. Examples 7 to 14 were carried out in the same manner as in Example 1 except for the above.

As shown in FIG. 6(b), a lens array and a polarizing film were bonded to a liquid crystal panel by an acrylic adhesive to obtain a liquid crystal display device for observing moire fringes and color irregularity.

Further, as shown in FIG. 8, the optical laminate of the present invention composed of the pattern retardation plate and the polarizing film was fixed between the lens array and the liquid crystal panel by an acrylic adhesive to manufacture a liquid crystal display device for observing stereoscopic display blurring. The liquid crystal panel comprises: a liquid crystal cell including pixel groups for right eye and pixel groups for left eye (The structures of Examples 7 to 14 differ from that of FIG. 8 in a point that substrates are laminated on both surfaces of a polarizing film). In Examples 10 and 11, acrylic-based resin films (AC) were used as substrates.

As well as Example 1, an environmental test was carried out for a liquid crystal display device by heating at 80° C. for 24 hours. After the test, there were no color irregularity, moire fringes, and stereoscopic display blurring and therefore, there was no deterioration in display. Dimension changes in an environmental test for the polarizing film alone by heating at 80° C. for 120 hours were indicated as per Table 1.

Comparative Example 1

A lens array and a conventional polarizing film (produced by NITTO DENKO CORPORATION; product name: NPF) with one side of a protective film (thickness: 40 μm) were bonded to a liquid crystal panel by an acrylic adhesive to manufacture a liquid crystal display device for observing moire fringes and color irregularity. The protective film was a triacetyl cellulose resin film (TAC).

Further, an optical laminate composed of a pattern retardation plate and a conventional polarizing film (produced by NITTO DENKO CORPORATION, product name: NPF) with a protective film (thickness: 40 μm) on one side thereof was fixed between a lens array and a liquid crystal panel by an acrylic adhesive to manufacture a liquid crystal display device for observing stereoscopic display blurring. The liquid crystal panel comprises: a liquid crystal cell including pixel groups for right eye and pixel groups for left eye.

An environmental test was carried out for the liquid crystal display device in Comparative Example 1 by heating at 80° for 24 hours. After the test, color irregularity, moire fringes, and stereoscopic display blurring were generated and deterioration in display characteristic was found. When an environmental test was carried out for the polarizing film alone used in Comparative Example 1 by heating at 80° C. for 120 hours, dimension change rates were −0.730% in MD (a machine direction) and −0.406% in TD (a transverse direction).

Comparative Example 2

A liquid crystal display device was produced in the same manner as in Comparative Example 1 except that the protective film had a thickness of 80 μm. An environmental test at 80° C. for 24 hours was carried out in the same manner as in Comparative Example 1. After the test, color irregularity, moire fringes, and stereoscopic display blurring were generated and deterioration in display characteristic was found. Results of the environmental test for the polarizing film alone at 80° C. for 120 hours were indicated as per Table 1.

Comparative Examples 3 to 8

As shown in FIG. 3(a), a liquid crystal display device was produced in the same manner as in Comparative Example 1 except that two protective films were laminated on both sides of a polarizer and the protection films respectively had a thickness as indicated in Table 1. In Comparative Example 6, acrylic resin films (AC) were used as protective films.

An environmental test at 80° C. for 24 hours for each liquid crystal display device for each Comparative Example was carried out in the same manner as in Comparative Example 1. After the test, color irregularity, moire fringes, and stereoscopic display blurring were generated and deterioration in display characteristic was found. Results of the environmental test for the polarizing film alone at 80° C. for 120 hours were indicated as per Table 1.

TABLE 1

| | Production method of polarizer | Kind of Substrate | Substrate | Thickness of substrate (μm) | Thickness of polarizer (μm) | Dimension change rate (%) MD | Dimension change rate (%) TD | Moire fringes and color irregularity | Stereoscopic display blurring |
|---|---|---|---|---|---|---|---|---|---|
| Example 1 | Coating | One side | Arton | 40 | 1.3 | −0.022 | −0.049 | No | No |
| Example 2 | ↓ | | | | 1.7 | −0.057 | −0.077 | No | No |
| Example 3 | Stretching | | | | 4.0 | −0.154 | −0.103 | No | No |
| Example 4 | ↓ | | | 60 | 1.7 | −0.062 | −0.096 | No | No |
| Example 5 | Dyeing | | | 80 | | −0.047 | −0.095 | No | No |
| Example 6 | | | | | 4.0 | −0.100 | −0.090 | No | No |
| Example 7 | | Both sides | | 40 | 1.7 | −0.039 | −0.068 | No | No |
| Example 8 | | | | 60 | | −0.032 | −0.069 | No | No |
| Example 9 | | | | 80 | | −0.030 | −0.058 | No | No |
| Example 10 | | | AC | 20 | | −0.041 | −0.081 | No | No |
| Example 11 | | | | 40 | | −0.040 | −0.073 | No | No |
| Example 12 | | | Arton | | 4.0 | −0.088 | −0.076 | No | No |
| Example 13 | | | | 80 | | −0.071 | −0.050 | No | No |
| Example 14 | | | | 40 | 7.2 | −0.142 | −0.133 | No | No |
| Comparative Example 1 | Film ↓ | One side | TAC | 40 | 25 | −0.730 | −0.406 | Yes | Yes |
| Comparative Example 2 | Dyeing ↓ | | | 80 | | −0.481 | −0.400 | Yes | Yes |
| Comparative Example 3 | Stretching | Both sides | | 40 | 20 | −0.372 | −0.243 | Yes | Yes |
| Comparative Example 4 | | | | | 25 | −0.402 | −0.284 | Yes | Yes |
| Comparative Example 5 | | | | | 30 | −0.456 | −0.326 | Yes | Yes |
| Comparative Example 6 | | | AC | | 25 | −0.391 | −0.312 | Yes | Yes |
| Comparative Example 7 | | | TAC | 60 | | −0.329 | −0.297 | Yes | Yes |
| Comparative Example 8 | | | | 80 | | −0.307 | −0.242 | Yes | Yes |

(Note):
(1) TAC = Triacetyl cellulose film, AC = Acrylic resin film, Arton = Norbornene-based resin film
(2) MD = Machine direction, TD = Transverse direction

[Evaluation Method]
[Dimension Change Rate of Polarizing Film:

An acrylic adhesive with a thickness of 20 μm was formed on the produced polarizing film. Thus obtained polarizing film with an adhesive was cut into a size of 100 mm×100 mm so that a stretching direction thereof may be 0° to be bonded to a glass plate with a thickness of 1 mm so as to be used as a measuring sample. Subsequently, four corners of the polarizing film were marked.

A length $L_0$ between the marks of the four corners in the polarizing film was measured with a vision measuring system produced by MITSUTOYO CORPORATION (Quick Vision).

The measured sample was put into a heating oven at 80° C. for 120 hours and subsequently, the length $L_{120}$ between four corners of the polarizing film was measured again.

The dimension change rate of the polarizing film was calculated from the following equation:

$$\text{Dimension change rate}(\%) = \{(L_{120} - L_0)/L_0\} \times 100$$

[Moire Fringe and Color Irregularity]

A liquid crystal display device for observing moire fringes and color irregularity was manufactured and was exposed to under a heating environment (at 80° C., for 24 hours). Subsequently, moire fringes and color irregularity were visually observed.

[Stereoscopic Display Blurring]

A liquid crystal display device for observing stereoscopic display blurring was manufactured and was exposed to under a heating environment (at 80° C., for 24 hours). Subsequently, stereoscopic display blurring was visually observed.

INDUSTRIAL APPLICABILITY

An optical laminate of the present invention, in which a polarizing film and an optical element are laminated, has an extremely small dimension change rate typically due to temperature changes and distortion of a lens array was minimized. This makes it possible to appropriately control a traveling direction of light emitted from the lens array for a long period of time.

Further, in a liquid crystal display device with this optical laminate of the present invention, moire fringes and color irregularity and stereoscopic display blurring are not easily generated because the traveling direction of light emitted from the optical laminate is appropriately controlled, even when placed at a high temperature for a long period of time. As a result, the liquid crystal display device is capable of displaying high definition.

Thus, the liquid crystal display device of the present invention is particularly suitable for the use in an environment which is severe to temperature conditions, for example, vehicle installation, Factory automation, and outdoors or the like.

What is claimed is:

1. An optical laminate comprising:
   an optical element; and
   a polarizing film wherein a thin polarizing layer is laminated on one main surface of a substrate,
   the optical element and the polarizing film are laminated and the thin polarizing layer has a thickness of 8 μm or less, the polarizing film has a dimension change rate of −0.2% to 0%.

2. The optical laminate according to claim 1, wherein the substrate has a thickness of 20 μm to 80 μm.

3. The optical laminate according to claim 2, wherein the optical element is a lens array having a plurality of lenses to control a traveling direction of light.

4. The optical laminate according to claim 2, wherein the optical element is a retardation plate including a plurality of regions having different slow axis directions.

5. A liquid crystal display device, comprising:
a liquid crystal panel; and
an optical laminate according to claim 2.

6. The optical laminate according to claim 1, wherein the optical element is a lens array having a plurality of lenses to control a traveling direction of light.

7. A liquid crystal display device, comprising:
a liquid crystal panel; and
an optical laminate according to claim 6.

8. The optical laminate according to claim 1, wherein the optical element is a retardation plate including a plurality of regions having different slow axis directions.

9. A liquid crystal display device, comprising:
a liquid crystal panel; and
an optical laminate according to claim 8.

10. A liquid crystal display device, comprising:
a liquid crystal panel; and
an optical laminate according to claim 1.

* * * * *